(12) United States Patent

Holm, Jr. et al.

(10) Patent No.: US 9,436,473 B2
(45) Date of Patent: Sep. 6, 2016

(54) SCHEDULING PROGRAM INSTRUCTIONS WITH A RUNNER-UP EXECUTION POSITION

(71) Applicant: ARM LIMITED, Cambridge (GB)

(72) Inventors: Rune Holm, Jr., Cambridge (GB); David Hennah Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 410 days.

(21) Appl. No.: 14/048,141

(22) Filed: Oct. 8, 2013

(65) Prior Publication Data

US 2015/0100768 A1    Apr. 9, 2015

(51) Int. Cl.
  *G06F 9/30* (2006.01)
  *G06F 9/32* (2006.01)
  *G06F 9/40* (2006.01)
  *G06F 9/38* (2006.01)

(52) U.S. Cl.
  CPC ........... *G06F 9/30145* (2013.01); *G06F 9/321* (2013.01); *G06F 9/3802* (2013.01)

(58) Field of Classification Search
  CPC ............. G06F 9/30145; G06F 9/3806; G06F 9/3802; G06F 9/321
  See application file for complete search history.

(56) References Cited

U.S. PATENT DOCUMENTS

| | | | | |
|---|---|---|---|---|
| 6,401,196 B1* | 6/2002 | Lee | ......................... | G06F 9/325 711/213 |
| 7,015,913 B1* | 3/2006 | Lindholm | ............. | G06F 9/3851 345/501 |
| 7,996,654 B2* | 8/2011 | Luick | .................... | G06F 9/3838 712/214 |
| 2011/0063294 A1* | 3/2011 | Brown | ................... | G06T 15/005 345/423 |
| 2011/0219221 A1* | 9/2011 | Skadron | ................ | G06F 9/3851 712/235 |

OTHER PUBLICATIONS

Collange, "Stack-less SIMT reconvergence at low cost", *ENS de Lyon, Universite de Lyon*, Sep. 12, 2011, pp. 1-11.
Fung et al., "Dynamic Warp Formation and Scheduling for Efficient GPU Control Flow", *IEEE Computer Society*, 2007, pp. 407-418.

* cited by examiner

*Primary Examiner* — Daniel Pan
(74) *Attorney, Agent, or Firm* — Nixon & Vanderhye P.C.

(57) ABSTRACT

A single instruction multiple thread (SIMT) processor includes scheduling circuitry for calculating a next scheduled execution point for execution circuits which execute respective threads corresponding to a common program. In addition to calculating the next scheduled execution point, the scheduling circuitry determines a runner up execution point which would have been determined as the next scheduled execution point if the threads which actually correspond to the next scheduled execution point had been removed from consideration. This runner up execution point is used to identify points of re-convergence within the program flow and as part of the operation of a static branch predictor.

17 Claims, 4 Drawing Sheets

SCHEDULING PROGRAM INSTRUCTIONS WITH A RUNNER-UP EXECUTION POSITION

BACKGROUND

This invention relates to the field of data processing systems. More particularly, this invention relates to the scheduling of program instructions within data processing systems.

It is known to provide data processing systems including a plurality of execution circuits/units which execute a common program as a respective plurality of threads of program execution. Such data processing systems are sometimes termed single instruction multiple thread (SIMT) processors. The aim within such processors is that each of the execution units should execute the same block of code in lockstep with respect to the other execution units. This permits a saving in the amount of instruction decode circuitry that need be provided together with increasing the likelihood of achieving efficiency gains in memory accesses due to the memory accesses being correlated in a manner which permits them to be performed more efficiently. While each of the threads executes a common program, there may be points of divergence (branches) and convergence within the respective execution paths followed in the different threads executed upon the different execution units. This will result in some of the threads dropping out of lockstep operation and then resuming lockstep operation at a later time when they can be brought back to the same execution point.

SUMMARY OF THE INVENTION

Viewed from one aspect the present invention provides apparatus for processing data comprising:

a plurality of execution circuits configured to execute a common program as a respective plurality of threads of program execution; and scheduling circuitry configured to determine a next scheduled execution position within said common program corresponding to a next program instruction to be executed by at least one of said plurality of execution circuits while any of said plurality of execution circuits at a current execution position in their path through said common program not followed by said next scheduled position do not execute said next program instruction; wherein said scheduling circuitry is configured also to calculate a runner up execution position that would have been determined as said next scheduled execution position if said next program instruction was excluded from serving as said next scheduled execution position The present techniques recognise that scheduling within processing systems such as SIMT processing systems may be made more efficient if a runner up execution position is calculated in addition to the next scheduled execution position. The technical prejudice in the field is that the technique of the present invention would involve more computation to calculate the runner up execution point in addition to the next scheduled execution point, but in reality this additional information may be used to decrease the overall workload and increase the efficiency of the system as a whole.

In some embodiments of the invention the determination of the runner up execution position in addition to the next scheduled execution position allows a simplified and more efficient form of scheduling to be performed for the execution points lying between the next scheduled execution position and the runner up execution position. More particularly, an increment to the next instruction (consecutive instruction) within the computer program may be followed until the runner up execution position is reached. Using such a simplified form of scheduling between points at which a full determination of the next scheduled execution position is performed saves energy and in practice such simple incrementing of the execution position covers a large proportion of the scheduling decisions which need to be made. Potential branch points within the execution path are identified as points at which a full determination of the scheduling needs to be performed and in addition points at which the execution position reaches a previously calculated runner up execution position are also triggers for a full determination of the scheduling to be performed. Such points where the execution position reaches a previously calculated runner up execution position correspond to points of potential re-convergence within the program flow.

The scheduling performed during a full determination can take a variety of different forms. In some embodiments the scheduling is performed by selecting as one or more candidate threads those threads having a deepest function call depth. Following this selection, the next candidate instruction within each of the selected threads can be examined for its program counter value and the lowest program counter value in program execution order may be selected to serve as the next scheduled execution position. It will be appreciated that such a full determination is relatively computationally expensive and accordingly why the present technique, which permits such a full determination only to be performed when necessary, produces a worthwhile energy saving.

Efficiency may be further improved in embodiments in which the scheduling circuitry uses shared determination hardware to determine both the next scheduled position and the runner up execution position.

In some embodiments the shared determination hardware is configured to determine the runner up execution position during a processing cycle following that in which the next scheduled execution position was determined. In practice, the runner up execution position is not actually required until at least one processing cycle after the next scheduled execution position has been calculated.

The present techniques are particularly useful when the instruction set from which the computer program executed by the threads is formed is one which does not include marker instructions for marking points of full determination of scheduling. The ability to reuse an instruction set which does not include such marker instructions has advantages such as code portability, but suffers from the potential disadvantage of suffering from less efficient scheduling. This disadvantage is addressed by the present techniques.

The determination of the runner up execution position may also be used to enhance the operation of branch prediction circuitry provided within the system whereby the runner up execution point may form at least part of a branch prediction result in at least some situations.

In the context of, for example, the SIMT processors previously discussed, the potential predicted branch targets which may be used to direct more efficient instruction prefetch may be selected from one or more of the branch target of the branch instruction, the instruction immediately following the branch instruction and a previously determined runner up execution point. Which of these potential predicted branch target results is utilised may be selected depending upon the nature of the branch instruction encountered, e.g. whether the branch instruction is conditional or unconditional, whether the branch instruction is a forward branch or a backward branch, whether the branch target is before or after a previously determined runner up execution point, whether the branch instruction is part of a function call etc. The decision table for which of the potential predicted branch target addresses should be selected in the above situations is set out in the following description of example embodiments.

Viewed from another aspect the present invention provides apparatus for processing data comprising:

a plurality of execution means for executing a common program as a respective plurality of threads of program execution; and scheduling means for determining a next scheduled execution position within said common program corresponding to a next program instruction to be executed by at least one of said plurality of execution means while any of said plurality of execution means at a current execution position in their path through said common program not followed by said next scheduled position do not execute said next program instruction; wherein said scheduling means also calculates a runner up execution position that would have been determined as said next scheduled execution position if said next program instruction was excluded from serving as said next scheduled execution position.

Viewed from a further aspect the present invention provides a method of processing data comprising the steps of:

executing a common program as a respective plurality of threads of program execution with a plurality of execution circuits; and scheduling including determining a next scheduled execution position within said common program corresponding to a next program instruction to be executed by at least one of said plurality of execution circuits while any of said plurality of execution circuits at a current execution position in their path through said common program not followed by said next scheduled position do not execute said next program instruction; wherein said step of scheduling also includes calculating a runner up execution position that would have been determined as said next scheduled execution position if said next program instruction was excluded from serving as said next scheduled execution position.

The above, and other objects, features and advantages of this invention will be apparent from the following detailed description of illustrative embodiments which is to be read in connection with the accompanying drawings.

DESCRIPTION OF THE EMBODIMENTS

Figure 1:
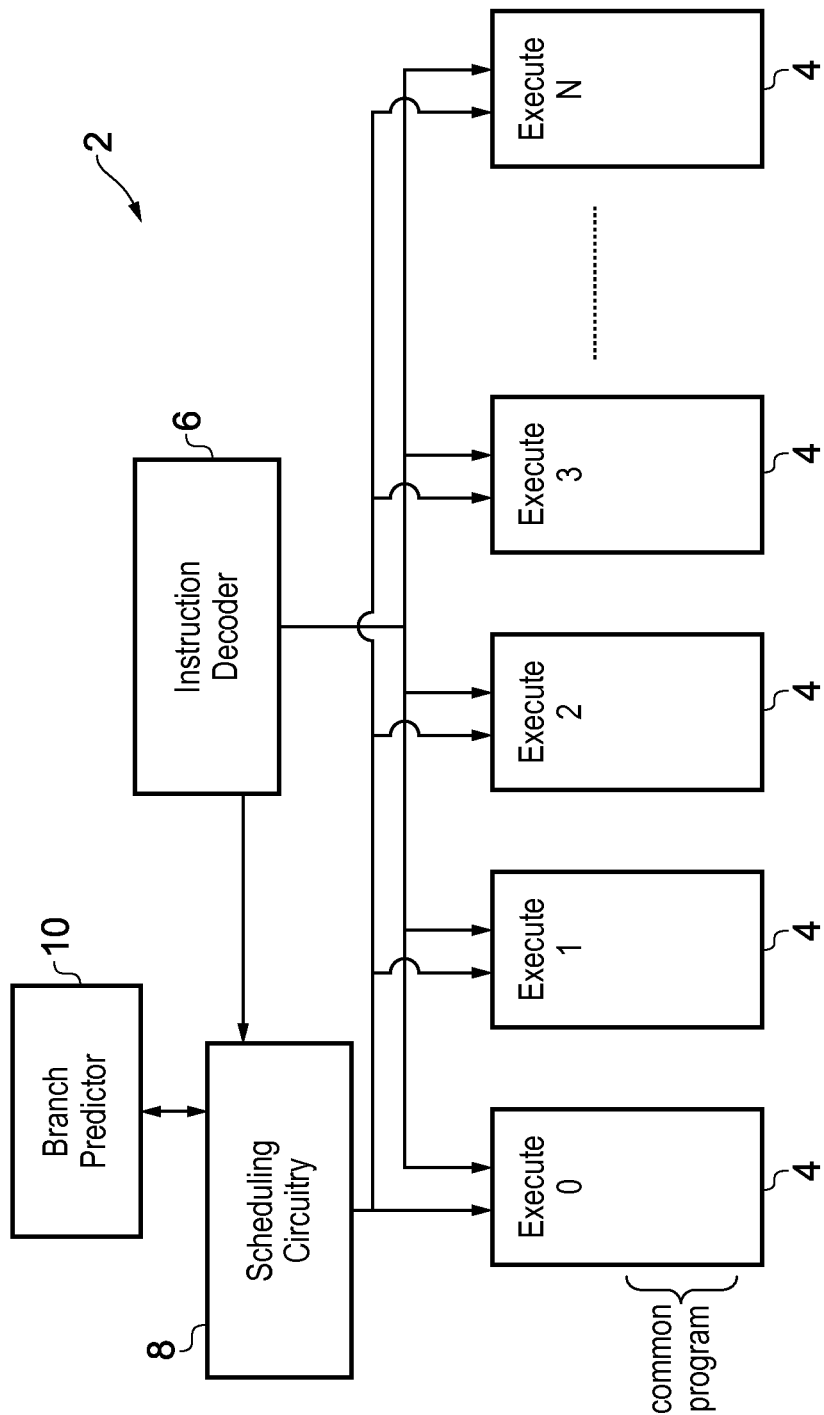
FIG. 1 schematically illustrates an SIMT data processing system including scheduling circuitry and branch prediction circuitry.

FIG. 1 schematically illustrates a SIMT processor 2 including a plurality of execution circuits 4 each executing a common program. The SIMT processor also includes instruction decoder circuitry 6, scheduling circuitry 8 and branch prediction circuitry 10. The different execution circuits 4 execute a common program.

The scheduling circuitry 8 is responsible for determining which will be the next instruction to be executed (if any) by each of the execution circuits 4 as will be described further below. The scheduling circuitry 8 calculates both a next scheduled execution position and a runner up execution position when it is performing a full determination of the scheduling. At points within the program flow where a full determination is not required, the scheduling circuitry 8 simply increments the program counter so as to indicate the next program instruction to be executed.

The branch prediction circuitry 10 serves to identify branch instructions decoded by the instruction decoder 6 and performs a prediction as to whether or not those branches will be followed and accordingly direct the prefetching of instructions to be supplied to the instruction decoder 6. The branch prediction circuitry 10 may perform a static branch prediction dependent upon the decoded branch instruction (including function call instructions) detected without relying upon the complication of storing history data as may be done in more sophisticated branch prediction circuits. However, the present technique of utilising a runner up execution position as an input to the branch prediction circuitry 10 and/or a potential output from the branch prediction circuitry 10 is possible within branch prediction circuitry other than static branch prediction circuitry as will be discussed below.

Figure 2:
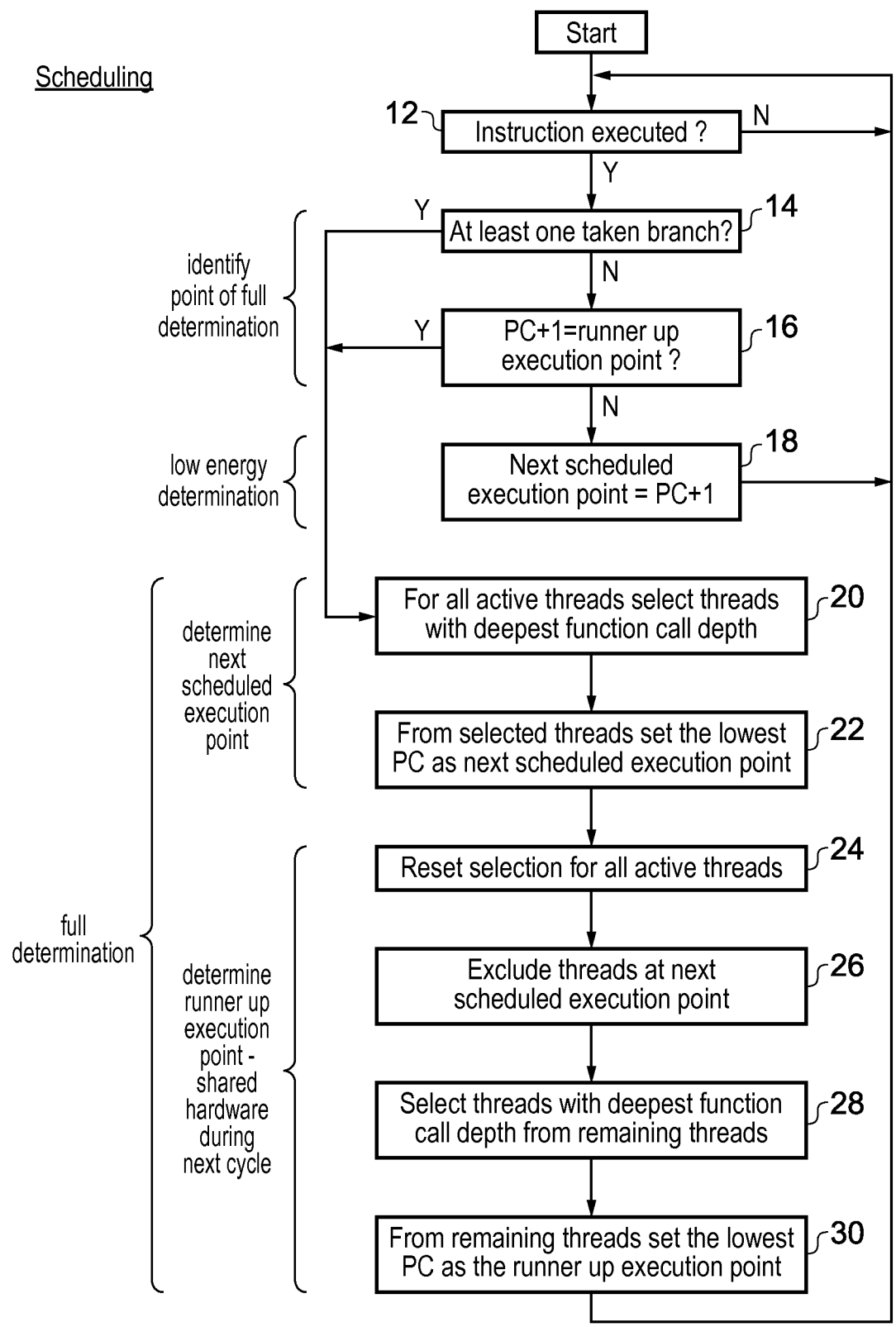
FIG. 2 is a flow diagram schematically illustrating scheduling operation including determination of a next scheduled execution point and determination of a runner up execution point.

FIG. 2 is a flow diagram schematically illustrating the operation of the scheduling circuitry 8. At step 12 processing waits until an instruction has been executed indicating that a next scheduled instruction needs to be identified. Step 14 determines whether at least one of the execution circuits 4 has executed a taken branch instruction (e.g. an unconditional branch instruction, a conditional branch instruction which passed its condition codes, a function call etc.). If no taken branch is identified, then the processing proceeds to step 16 where a determination is made as to whether or not the current program counter if incremented would match the last calculated runner up execution position. If step 16 indicates no match, then processing proceeds to step 18 where the next scheduled execution point is taken to be the incremented program counter value so that program flow advances in the normal manner. This next scheduled execution point will then be applied to all of those execution circuits 4 which are currently active, as may be indicated by an execution mask maintained by the scheduling circuitry 8.

The function of steps 14 and 16 is to identify when a point of full determination has been reached. At such a point, a more sophisticated and more energy consuming determination of the next scheduled execution point is made. If such a full point of determination is not identified, then step 18 performs a low energy determination of the next execution point by incrementing the program counter value.

If either step 14 or step 16 indicates that a point of full determination has been reached, then processing proceeds to step 20 where for all active threads (whether stalled or unstalled) those with the deepest function call depth are selected as potential candidates for providing the next scheduled execution point. The scheduling circuitry 8 is configured to track the function call depth of each of the threads. Step 22 then examines the threads selected at step 20 and determines which has the lowest program counter value indicating its execution position as this will correspond to the earliest potential execution position to serve as the next scheduled execution point. This lowest program counter value is then selected as the next scheduled execution point.

Step 24 then resets the selection of threads for consideration to include all the active threads. Step 26 then removes from the selection, those threads which have as their execution position the program counter value that has been calculated at step 22 to be the next scheduled execution point. Step 28 then selects from among the remaining threads those with the deepest function call depth and step 30 identifies the lowest program counter value among the threads selected at step 28 to serve as the runner up execution point.

At an overall level, steps 20 and 22 determine the next scheduled execution point and steps 24, 26, 28 and 30 determine the runner up execution point. The scheduling circuitry 8 may use shared determination hardware to perform the processing so as to first perform the determination of a next scheduled execution point and then, in the immediately following processing cycle, determine the runner up execution point. In practice, the runner up execution point is not required until at least one processing cycle after that the next scheduled execution point is generated, thereby permitting such a sharing of the determination hardware.

The instruction decoder 16 may be configured to decode an instruction set which does not include any marker instructions for marking points for full determination to be performed. As an example, the instruction set used by the instruction decoder 6 and serving to form the common program executed by the execution circuits 4 may be the ARM instruction set as used by processors designed by ARM Limited of Cambridge, England. The use of such a general purpose instruction set within the SIMT processor 2 of FIG. 1 facilitates code portability and also exploits the wide spread familiarity of this instruction set.

Figure 3:
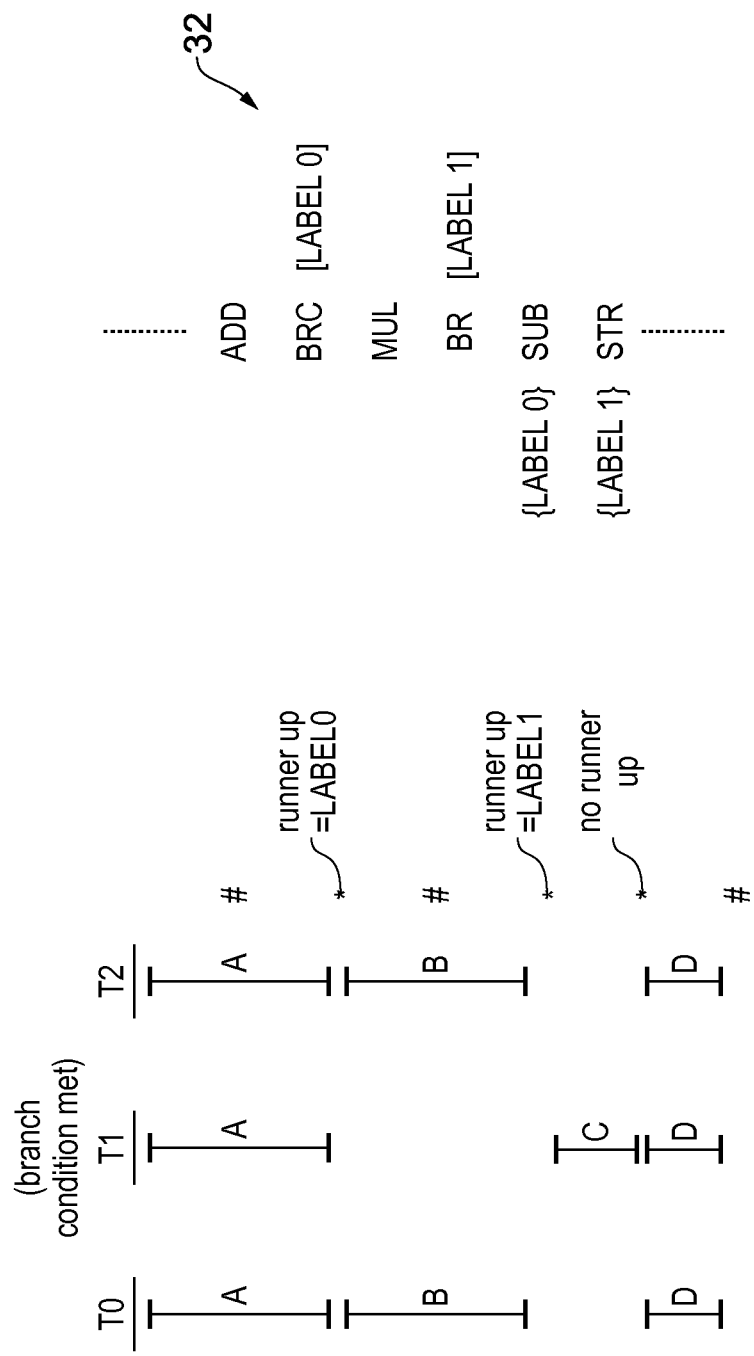
FIG. 3 is a diagram schematically illustrating an example of the execution path followed by different threads within a SIMT processor.

FIG. 3 schematically illustrates the execution path followed by three threads. The common program 32 executed in the three threads includes a conditional branch instruction BRC and an unconditional branch instruction BR. Thread T1 has its branch condition met and accordingly its program flow bypasses the multiplication instruction MUL. The unconditional branch instruction BR is taken by both threads T0 and T2 and accordingly the subtraction instruction SUB is only performed by thread T1.

As illustrated in FIG. 3 the threads T0, T1 and T2 first all execute in lockstep to perform the ADD instruction. The ADD instruction does not correspond to a branch or a previously calculated runner up execution point and accordingly the scheduling performed after execution of the ADD instruction can be a simple increment of the program counter value.

Following the execution of the ADD instruction in lockstep by all of the threads T0, T1, T2, the threads all execute the conditional branch instruction, but only thread T1 meets the condition code. As the instruction decoded is a branch instruction with at least one of the threads taking the branch, as indicated in step 14 of FIG. 2, this identifies a point at which a full determination needs be performed so as to determine the next scheduled execution point. This full determination is performed in accordance with FIG. 2. The next scheduled execution point is identified is the MUL instruction and this will be executed by the threads T0 and T2, with the thread T1 being stalled (as indicated by an execution mask maintained by the scheduling circuitry 8). The SUB instruction is identified as the runner up execution point which would have been identified as the next scheduled execution point if threads T0 and T2 were excluded from consideration.

As the MUL instruction is not a branch instruction and the execution point has not reached the current runner up execution point (LABEL0), the scheduling performed after the MUL instruction is a simple program counter increment. When the branch instruction BR is executed and taken by threads T0, T2, it is identified as a point at which a full determination needs to be determined. At this time, the SUB instruction will be identified as the next scheduled execution point as it has the lowest program counter value for all of the threads eligible for execution in the next cycle and accordingly thread T1 will execute the SUB instruction. The scheduling performed to determine what instruction is to be executed following the SUB instruction, and by which threads, is a full determination since the program counter value following the program counter value of the SUB instruction matches the runner up execution point that was calculated following execution of the unconditional branch instruction BR. This corresponds to the test at step 16 of FIG. 2 indicating that a full determination should be made. More particularly, this test indicates that a potential point of re-convergence has been reached. The result of the scheduling performed following the SUB instruction is that all three threads T0, T1 and T2 are brought back together into lockstep and execute the store instruction STR.

As previously discussed, the branch prediction circuitry 10 of FIG. 1 also uses the runner up execution point calculated in steps 24, 26, 28 and 30 of FIG. 2 as part of its static branch prediction operation. The branch prediction circuitry 10 can take the form of a state machine, which is relatively simple and follows the decision table illustrated in FIG. 4. In particular, different static predictions are made in dependence upon whether a branch encountered is a conditional branch instruction or an unconditional branch instruction, whether a branch encountered is a forward branch or a backward branch, whether the branch target of the branch is before or after the currently calculated runner up execution point and whether or not the branch instruction is a function call. The static branch prediction of FIG. 4 is performed only in relation to direct branch instructions for the sake of simplicity, with any indirect branch instructions (e.g. branch target not determined by the instruction decoder 6 itself) not being subject to any branch prediction.

The inputs used by the branch prediction circuitry 10 in performing a static branch prediction include the branch target specified by the branch instruction, the old program counter value indicating the instruction immediately following the branch instruction being predicted, and the old runner up execution point indicating the runner up execution point calculated before the branch instruction was encountered and being the current runner up execution point at that time. The output of the branch prediction circuitry 10 is a predicted branch target address for which prefetching is to be performed and is indicated by the New PC value in FIG. 4. Also output from the branch prediction circuitry 10 is a new runner up execution position, which will be current until another runner up execution is calculated upon a next full determination point being reached.

Figure 4:
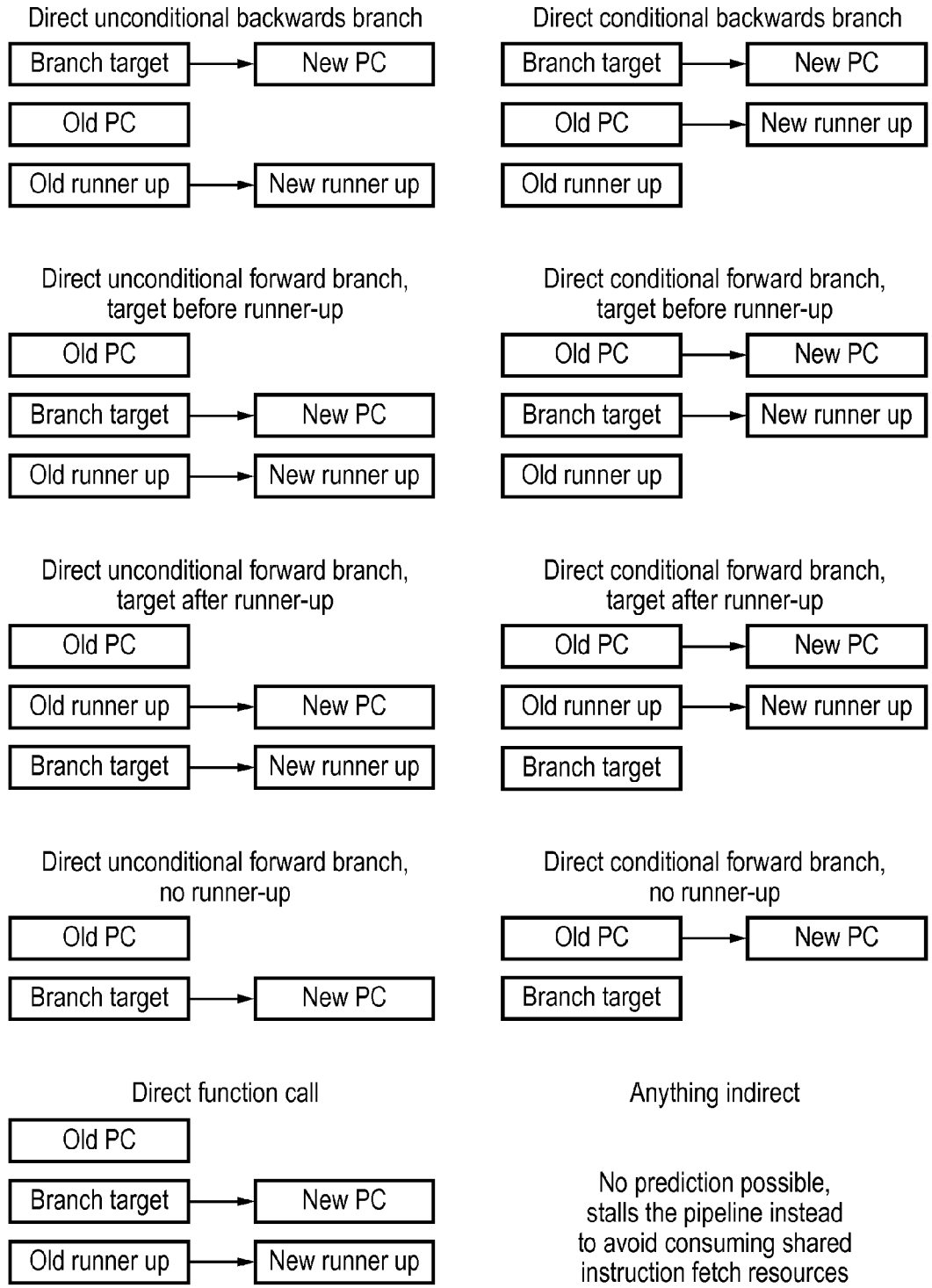
FIG. 4 is a diagram illustrating a decision table used by branch prediction circuitry employing a runner up execution position as at least an input to the branch prediction operation.

In order to aid the understanding of FIG. 4, the example of the direct unconditional backwards branch may be considered. In this example, the predicted branch target address used as the New PC value is the branch target address specified by the branch instruction encountered. This prediction is made as unconditional branch instructions are to be followed, as the old runner up execution point will necessarily be more advanced in the program flow direction. Accordingly, the new runner up execution point is taken to be the same as the old runner up execution point.

In the case of a direct conditional backward branch instruction, this is predicted as being taken but the program counter value immediately following the taken branch is now used as the new runner up execution point as it will necessarily be more advanced than the previously calculated runner up execution point.

In the case of a direct unconditional forward branch with the target before the current runner up execution point, the predicted branch target address is the branch target address specified in the branch instruction. The old runner up execution point is carried forward to be the new runner up execution point.

In the case of a direct conditional forward branch instruction where the branch target is before the current runner up execution point, the branch is not taken and the old program counter value (the program counter position immediately following the branch instruction) is used as the predicted branch target address. The branch target address specified in the branch instruction forms the new runner up execution point.

In the case of an unconditional forward branch with the target after the current runner up execution point, the current runner up execution point is used as the predicted branch target address. The branch target address specified in the branch instruction is used as the new runner up execution point.

In the case of a direct conditional forward branch with the target address after the current runner up execution point, the old program counter value is used as the predicted branch target address (e.g. the branch is not taken) and the old runner up execution point is carried forward to be the new runner up execution point.

In the case of a direct unconditional forward branch where there is no current runner up execution point (i.e. all of the active threads are in lockstep), then the branch target specified in the branch instruction serves as the predicted branch target address. In the case of a direct conditional forward branch where there is no current runner up execution point, the branch is predicted as not taken and the program counter address immediately following the branch instruction address is taken as the predicted branch target address.

In the case of a direct function call, the call is predicted as taken and the branch instruction address (call address) is taken as the predicted branch target address. The old runner up execution point is carried forward as the new runner up execution point.

In the case of any indirect branch instructions (i.e. the branch instruction itself does not specify the branch target as this may, for example, be held in a register referenced in the branch instruction), then no prediction is made with the branch predictor 10 of FIG. 1.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
    a plurality of execution circuits configured to execute a common program as a respective plurality of threads of program execution; and
    scheduling circuitry configured to determine a next scheduled execution position within said common program corresponding to a next program instruction to be executed by at least one of said plurality of execution circuits while any of said plurality of execution circuits at a current execution position in an execution path through said common program not followed by said next scheduled position do not execute said next program instruction; wherein said scheduling circuitry is configured to:
    calculate a runner up execution position that would have been determined as said next scheduled execution position if said next program instruction was excluded from serving as said next scheduled execution position;
    determine said next scheduled execution position so as to follow an execution path corresponding to consecutive instructions in program counter order unless a point of full determination is detected by said scheduling circuitry whereupon said scheduling circuitry performs a full determination of said next scheduled execution position that provides for one or more possible execution paths not corresponding to consecutive instructions in program counter order;
    calculate said runner up execution position upon said detection of a current point of full determination; and
    detect a further point of full determination if said execution path reaches said runner up execution position.

2. Apparatus as claimed in claim 1, wherein said scheduling circuitry is configured to detect as said further point of full determination if said execution path reaches a branch instruction corresponding to said execution path not corresponding to consecutive instructions in program counter order.

3. Apparatus as claimed in claim 1, wherein said determination of said next scheduled execution position and said runner-up execution position determined at said point of full determination are performed by:
    (i) selecting as one or more candidate threads among said plurality of threads having a deepest function call depth, each of said one or more candidate threads having a next candidate instruction to be executed; and
    (ii) among said next candidate instructions of said one or more candidate threads determining said next scheduled execution position to correspond to a next candidate instruction having a least advanced program counter value in program counter order.

4. Apparatus as claimed in claim 1, wherein said scheduling circuitry uses shared determination hardware to determine both said next scheduled execution position and said runner up execution position.

5. Apparatus as claimed in claim 4, wherein said shared determination hardware is configured to determine said next scheduled execution position during a given processing cycle and to determine said runner up execution position during a processing cycle immediately following said given processing cycle.

6. Apparatus as claimed in claim 1, wherein said common program is formed of program instruction from an instruction set not including marker instructions for marking points of full determination.

7. Apparatus as claimed in claim 1, comprising branch prediction circuitry configured to use said runner up execution point as at least a part of a branch prediction result for a branch instruction.

8. Apparatus as claimed in claim 7, wherein an instruction following said branch instruction in non-branching instruction execution flow has a no-branch address and said branch prediction result includes a predicted branch target address and a new runner up execution point.

9. Apparatus as claimed in claim 8, wherein when said branch instruction is a direct, unconditional backward branch instruction specifying a branch target address, said branch prediction circuitry generates a branch prediction result in which said predicted branch target address is said branch target address and said new runner up execution point is said runner up execution point.

10. Apparatus as claimed in claim 8, wherein when said branch instruction is a direct, conditional backward branch instruction specifying a branch target address, said branch prediction circuitry generates a branch prediction result in which said predicted branch target address is said branch target address and said new runner up execution point is said no-branch address.

11. Apparatus as claimed in claim 8, wherein when said branch instruction is a direct, unconditional forward branch instruction specifying a branch target address and said branch target address is before said runner up execution point in consecutive execution program order, said branch prediction circuitry generates a branch prediction result in which said predicted branch target address is said target branch address and said new runner up execution point is said runner up execution point.

12. Apparatus as claimed in claim 8, wherein when said branch instruction is a direct, conditional forward branch instruction specifying a branch target address and said branch target address is before said runner up execution point in consecutive execution program order, said branch prediction circuitry generates a branch prediction result in which said predicted branch target address is said no-branch address and said new runner up execution point is said branch target address.

13. Apparatus as claimed in claim 8, wherein when said branch instruction is a direct, unconditional forward branch instruction specifying a branch target address and said branch target address is after said runner up execution point in consecutive execution program order, said branch prediction circuitry generates a branch prediction result in which said predicted branch target address is said runner up execution point and said new runner up execution point is said branch target address.

14. Apparatus as claimed in claim 8, wherein when said branch instruction is a direct, conditional forward branch instruction specifying a branch target address and said branch target address is after said runner up execution point in consecutive execution program order, said branch prediction circuitry generates a branch prediction result in which said predicted branch target address is said no-branch address and said new runner up execution point is said runner up execution point.

15. Apparatus as claimed in claim 8, wherein when said branch instruction is a direct function call specifying a branch target address, said branch prediction circuitry generates a branch prediction result in which said predicted branch target address is said branch target address and said new runner up execution point is said runner up execution point.

16. Apparatus for processing data comprising:
a plurality of means for executing a common program as a respective plurality of threads of program execution; and
means for determining a next scheduled execution position within said common program corresponding to a next program instruction to be executed by at least one of said plurality of means for executing while any of said plurality of means for executing at a current execution position in an execution path through said common program not followed by said next scheduled position do not execute said next program instruction; wherein
said means for determining is configured to also calculate a runner up execution position that would have been determined as said next scheduled execution position if said next program instruction was excluded from serving as said next scheduled execution position; and wherein said means for determining is configured to:
determine said next scheduled execution position so as to follow an execution path corresponding to consecutive instructions in program counter order unless a point of full determination is detected by said means for determining whereupon said means for determining is configured to perform a full determination of said next scheduled execution position that provides for one or more possible execution paths not corresponding to consecutive instructions in program counter order;
calculate said runner up execution position upon said detection of a current point of full determination; and
detect a further point of full determination if said execution path reaches said runner up execution position.

17. A method of processing data comprising the steps of:
executing a common program as a respective plurality of threads of program execution with a plurality of execution circuits; and
scheduling including determining a next scheduled execution position within said common program corresponding to a next program instruction to be executed by at least one of said plurality of execution circuits while any of said plurality of execution circuits at a current execution position in an execution path through said common program not followed by said next scheduled position do not execute said next program instruction; wherein said step of scheduling includes:
calculating a runner up execution position that would have been determined as said next scheduled execution position if said next program instruction was excluded from serving as said next scheduled execution position;
determining said next scheduled execution position so as to follow an execution path corresponding to consecutive instructions in program counter order unless a point of full determination is detected by said scheduling circuitry whereupon said a full determination of said next scheduled execution position is performed that provides for one or more possible execution paths not corresponding to consecutive instructions in program counter order;
calculating said runner up execution position upon said detection of a current point of full determination; and
detecting a further point of full determination if said execution path reaches said runner up execution position.

* * * * *